(12) United States Patent
Barguet et al.

(10) Patent No.: US 11,148,478 B2
(45) Date of Patent: Oct. 19, 2021

(54) ADAPTER FOR A WHEELED ASSEMBLY AND A WHEELED ASSEMBLY COMPRISING SAME

(71) Applicant: COMPAGNIE GENERALE DES ETABLISSEMENTS MICHELIN, Clermont-Ferrand (FR)

(72) Inventors: Henri Barguet, Clermont-Ferrand (FR); Olivier Reix, Clermont-Ferrand (FR); Arthur Topin, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 463 days.

(21) Appl. No.: 16/098,539

(22) PCT Filed: Apr. 25, 2017

(86) PCT No.: PCT/FR2017/050979
§ 371 (c)(1),
(2) Date: Nov. 2, 2018

(87) PCT Pub. No.: WO2017/191389
PCT Pub. Date: Sep. 11, 2017

(65) Prior Publication Data
US 2019/0143762 A1    May 16, 2019

(30) Foreign Application Priority Data

May 2, 2016   (FR) ...................................... 1653952

(51) Int. Cl.
*B60C 15/02*    (2006.01)
*B60B 25/12*    (2006.01)
(Continued)

(52) U.S. Cl.
CPC .......... *B60C 15/0209* (2013.01); *B60B 21/10* (2013.01); *B60B 21/12* (2013.01);
(Continued)

(58) Field of Classification Search
CPC .......... B29D 2030/486; B60C 15/0209; B60B 21/12; B60B 21/125; B60B 21/10; B60B 25/12; B60B 25/045
See application file for complete search history.

(56) References Cited

U.S. PATENT DOCUMENTS 4,373,567 A * 2/1983 Declercq ................. B60B 21/10
152/379.3
5,232,034 A * 8/1993 Gergele .................... B60C 5/16
152/394
(Continued)

FOREIGN PATENT DOCUMENTS

DE    2514883 A1    10/1976
FR    3020313 B1    10/2015
(Continued)

OTHER PUBLICATIONS

International Search Report dated Aug. 2, 2017, in corresponding PCT/FR2017/050979 (4 pages).

*Primary Examiner* — Scott A Browne
(74) *Attorney, Agent, or Firm* — Venable LLP

(57) ABSTRACT

An adapter for a rolling assembly having an axis of rotation (YY'), the rolling assembly comprising a tyre having two beads, and a rim having two rim bead seats, for each bead, provides the connection between the bead and the rim, the said adapter comprising an axially inner end connected to the rim, an axially outer end comprising an outer reinforcing element and intended to come into contact, via a substantially radial axially inner face, or bearing face, with a bead, a body connecting the axially outer end to the axially inner end so as to form a single piece, comprising at least one main (Continued)

reinforcement providing the connection between the outer reinforcing element and the inner reinforcing element, and comprising a substantially axial adapter seat intended to come into contact with a bead. The outer reinforcing element is completely axially on the outside of the bearing face, and the outer reinforcing element is a substantially annular structure, referred to as a bead wire, of polygonal section, comprising an individual metal wire of diameter $D_1$, the said wire being coated in an elastomer composition and wound contiguously around a support at least three times in an axial direction and at least twice in a radial direction.

7 Claims, 6 Drawing Sheets

(51) Int. Cl.
- *B60B 25/04* (2006.01)
- *B60B 21/12* (2006.01)
- *B60B 21/10* (2006.01)
- *B29D 30/48* (2006.01)

(52) U.S. Cl.
CPC ............ *B60B 25/045* (2013.01); *B60B 25/12* (2013.01); *B29D 2030/486* (2013.01); *B60B 21/125* (2013.01); *B60B 2900/351* (2013.01)

(56) References Cited

U.S. PATENT DOCUMENTS

| | | | | |
|---|---|---|---|---|
| 5,363,896 | A * | 11/1994 | Kogure | B60C 15/06 152/543 |
| 6,626,217 | B2 * | 9/2003 | Bestgen | B60C 15/0203 152/379.4 |
| 2002/0088520 | A1 * | 7/2002 | Bestgen | B60C 15/0223 152/381.4 |
| 2016/0101581 | A1 * | 4/2016 | Sandstrom | C08K 3/04 152/541 |
| 2017/0001472 | A1 | 1/2017 | Ahouanto et al. | |
| 2017/0001473 | A1 | 1/2017 | Ahouanto et al. | |
| 2017/0057299 | A1 | 3/2017 | Daval | |

FOREIGN PATENT DOCUMENTS

| | | |
|---|---|---|
| WO | 2015/091618 A1 | 6/2015 |
| WO | 2015091620 A1 | 6/2015 |

* cited by examiner

ADAPTER FOR A WHEELED ASSEMBLY AND A WHEELED ASSEMBLY COMPRISING SAME

BACKGROUND

The invention relates to an adapter for a rolling assembly comprising a tyre and a rim, the said adapter being intended to provide the connection between the tyre and the rim. The invention also relates to a rolling assembly comprising the said adapter.

A tyre is a toric structure, the axis of revolution of which is the axis of rotation of the tyre, comprising a tread intended to come into contact with the ground, two sidewalls and two beads intended to come into contact with a rim, the two beads being connected to the tread by the two sidewalls.

A reminder of the definitions used in the present invention is given below:
"axial direction": direction parallel to the axis of rotation of the tyre,
"radial direction": direction perpendicular to the axis of rotation of the tyre,
"radial plane": plane which contains the axis of rotation of the tyre, and defined by the radial and axial directions,
"circumferential direction": direction perpendicular to a radial plane,
"equatorial plane": plane perpendicular to the axis of rotation and passing through the middle of the tread of the tyre.

Insertion of a connecting element or adapter between the rim and the beads of a tyre is already known from application WO2015091618. This adapter, made of reinforced rubber compounds, is elastically deformable at least in the two, radial and axial, directions, and comprises an axially inner end and an axially outer end. Such an adapter makes it possible to separate that part of the rolling assembly that can be considered to actually act as a tyre from that part of the rolling assembly that can be considered to act as a rim.

However, although such a rolling assembly allows the tyre to perform its conventional functions, notably a drift thrust response following the application of a drift angle to the tyre, thereby giving the rolling assembly sufficient flexibility to protect the tyre from any damage, it may cause cracks to appear or even spread in the outer reinforcer, that constitutes the axially outer end, as a result of multiple repeated shocks of the "pothole" type.

Specifically, the adapter of the above-referenced prior art, which ensures connection between each bead of the tyre and the rim, does not have optimum mechanical features, chiefly in terms of stiffness, that make it possible to absorb large deformations as the rolling assembly passes over potholes. This may lead to residual plastic deformation, or even breakage, of the said adapter and, therefore, to damage to the rolling assembly.

In addition, that document gives no suggestion regarding adapter design evolutions that might make it possible to overcome the aforementioned disadvantages.

Hence the inventors have set themselves the objective of proposing a new adapter which is more resistant to shocks and to high stress loadings when the rolling assembly is used on roads that are in poor condition, while at the same time further reducing the still excessively high stiffness of the outer end of the adapter.

One subject of the invention is thus an adapter for a rolling assembly having an axis of rotation (YY'), the rolling assembly comprising:
a tyre having two beads,
a rim having two rim bead seats,
for each bead, the said adapter providing the connection between the bead and the rim,
the said adapter comprising:
an axially inner end connected to the rim,
an axially outer end comprising an outer reinforcing element and intended to come into contact, via a substantially radial axially inner face, or bearing face, with a bead,
a body connecting the axially outer end to the axially inner end so as to form a single piece, comprising at least one main reinforcement providing the connection between the outer reinforcing element and the inner reinforcing element, and comprising a substantially axial adapter seat intended to come into contact with a bead.

SUMMARY

The adapter is characterized in that the outer reinforcing element is completely axially on the outside of the bearing face, and in that the outer reinforcing element is a substantially annular structure, referred to as a bead wire, of polygonal section, comprising an individual metal wire of diameter D1, the said wire being coated in an elastomer composition and wound contiguously around a support at least three times in an axial direction and at least twice in a radial direction.

The wire is wound in such a way as to form turns.

An adapter, the element connecting tyre and rim, allows a rolling assembly, during running, to have sufficient radial deformations at the bead of the tyre to afford the desired protection against lateral impacts.

The use of a metal wire in the outer reinforcing element having a large diameter makes it possible to achieve the requirements in terms of resistance to compressive loading when the tyre is being inflated and, as a result, avoid the phenomenon of buckling thanks to better cohesion between each turn of wire.

It will be recalled that the phenomenon of bead wire buckling results in a loss of pressure of the mounted assembly.

Moreover, using a metal wire completely coated in the elastomer composition makes it possible to greatly decrease the volume of empty spaces in the axially outer end, and thus improve the resistance to impact without damage thanks to an increase in the stiffness, by comparison with the use of a wire that is partially coated in elastomer. This increase in stiffness can be explained by the fact that the structure of the outer reinforcing element has a greater degree of cohesion.

Furthermore, because of its stability, the outer reinforcer according to the invention makes it possible to obtain a slight ovalization of the outer end of the adapter, thus optimizing the operation of the tyre during running.

The axially outer end of the adapter axially delimits a portion of the adapter body, referred to as adapter seat, and intended to receive a tyre bead. The adapter seat performs the same function as a rim seat, which is the substantially axial portion of a rim bead seat. In the axial direction, the bearing face of the axially outer end serves to support the bead of the tyre in the manner of a rim flange, which is the substantially radial portion of a rim bead seat. The tyre is therefore axially immobilized by the inflation pressure and is pressed firmly against the bearing face of this axially outer end, in the manner of what happens conventionally in the case of a bead of a tyre pressed against a rim flange.

The axially inner end of the adapter could be termed an "adapter bead" since it may be intended to attach the adapter to the seat of a rim bead in the same way as is conventionally done by a bead of a tyre pressed against a rim bead seat.

For preference, the axially inner end is connected to an edge of the rim, such as a rim flange, by any fixing means, such as by the conventional technique of clamping, bonding, crimping, screwing, with one or more centring grooves with or without reinforcement for clamping against a rim flange.

Thus, while in use, the tyre is practically axially immobilized with respect to the rim. More specifically, the beads of the tyre are axially immobilized with respect to the rim, like with a conventional rolling assembly in which the beads of the tyre are mounted directly on the rim bead seats. By contrast, the beads of the tyre are not immobilized radially with respect to the rim. More specifically, the beads of the tyre have the possibility of moving radially with respect to the rim. Under standard running conditions, the radial deformation of the adapter is negligible. On the other hand, during an impact, the radial deformation of the adapter can be great, thereby contributing to reducing the mechanical loadings on the rolling assembly.

For preference, the axially inner end comprises an inner reinforcing element intended to be mounted on a rim bead seat.

For preference, the elastomer composition coating the individual wire has a mean thickness comprised between 0.05 mm and 0.3 mm.

This elastomer composition may be selected from the elastomer compositions conventionally used in the field of tyres.

For preference, the diameter D1 of the individual wire is comprised between 0.5 mm and 5 mm. For preference, the wire is wound between 3 and 10 times in the axial direction, and between 2 and 9 times in the radial direction.

The winding of the wire in the form of contiguous turns and in various layers in the radial direction results in a structure similar to that of plies nested within one another in the form of layers. Such winding in the axial and radial directions makes it possible to adjust the radial height and the axial width of the successive layers.

The winding of the wire in various layers can be defined by the following relationship: $\Sigma N_i \times D_{fil}$ Where $D_{fil}$ represents the diameter of the wire used, and $N_i$ the number of wires in the layer of suffix "i".

The wire is coated with an elastomer composition that ensures the cohesion of the reinforcer according to the invention by limiting the possible movements between wires after vulcanization. The wire used is preferably made of steel.

For preference, the wire used is characterized by its strength Rm of between 1000 and 3000 MPa, and preferably of between 1400 and 2800 MPa, and the nature of its coating selected from zinc, brass or bronze.

For preference, the adapter may comprise a single assembly comprising two axially outer ends arranged one on each side of the wheel disc. It may also be made up of two independent parts, arranged on each rim flange using each axially inner end.

BRIEF DESCRIPTION OF THE DRAWINGS

The invention is described with reference to the following FIGS. 1 to 6, which are schematic and not necessarily drawn to scale.

DETAILED DESCRIPTION

Figure 1:
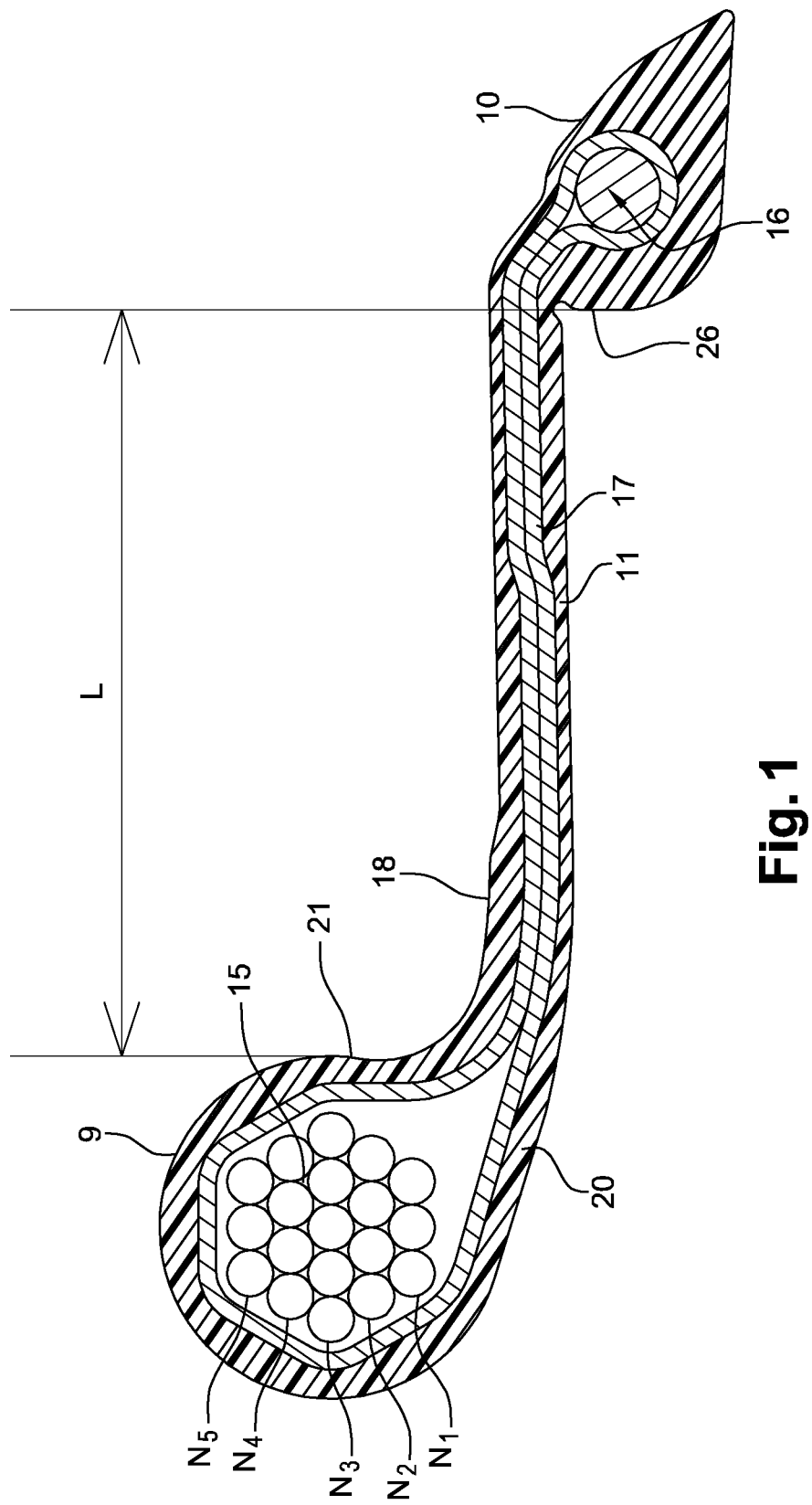
FIG. 1: a radial section of a non-mounted adapter, according to a first alternative form of the invention.

FIG. 1 depicts an adapter, not mounted on a rim, according to a first alternative form of the invention. This adapter comprises an axially outer end 9 comprising an outer reinforcing element 15, an axially inner end 10 comprising an inner reinforcing element 16, and a body 11 comprising a main reinforcement 17. The main reinforcement 17 is made up of a single reinforcing layer which is wound respectively around the inner reinforcing element 16 of the axially inner end 10 and around the outer reinforcing element 15 of the axially outer end 9. In the body 11, the main and return portions of the said reinforcing layer thus constitute a substantially radial stack of at least two reinforcing layers. The main reinforcement 17 is enveloped in a layer of elastomeric material 20. The body 11 further comprises an adapter seat 18 which is intended to come into contact with a tyre bead. The body 11 has an axial width L, measured between the axially inner face 21 of the axially outer end 9 and the axially outer face 26 of the axially inner end 10.

In FIG. 1, the outer reinforcing element 15 is an annular structure, referred to as a bead wire, made up of a construction of type (3+4+5+4+3). Each numeral indicates the number of turns of wire in a layer. The first layer N1 is arranged on the radially innermost part. The layers N2 to N5 are situated on the layers that are progressively radially further out. Thus, in this example, the layer N1 comprises 3 turns of wire, the layer N2 4 turns, the layer N3 5 turns, the layer N4 4 turns and the layer N5 3 turns. The first layer of wire is wound around a substantially circular support.

The wire used is a steel wire of diameter 2.15 mm, completely coated in a substantially uniform layer of elastomer composition measuring approximately 0.14 mm.

Figure 2:
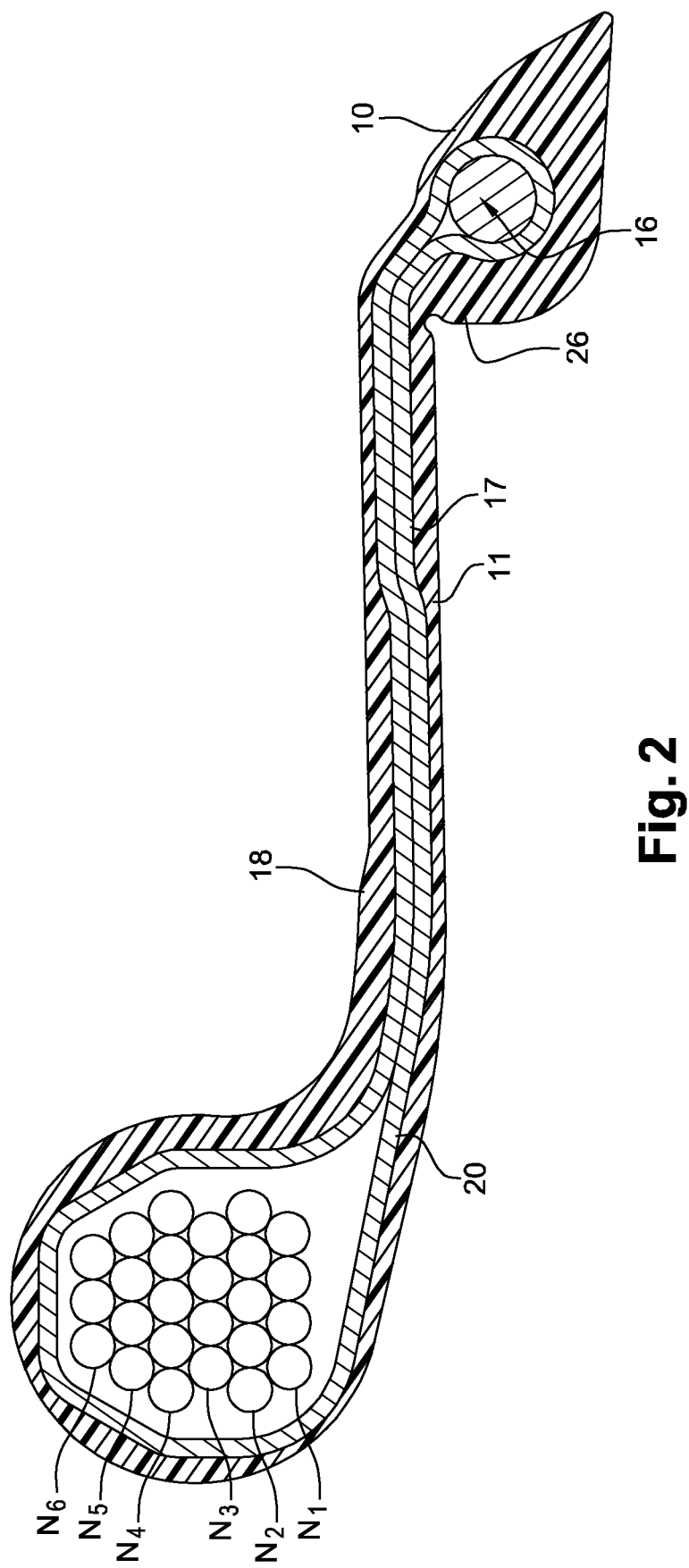
FIG. 2: a radial section of a non-mounted adapter, according to a second alternative form of the invention.

FIG. 2 differs from FIG. 1 in that it has a different construction of wire winding. In this figure, 6 successive layers of wire are arranged in the radial direction. The first layer N1 comprises 4 turns of wire, the layer N2 5 turns of wire, the layer N3 4 turns of wire, the layer N4 5 turns of wire, the layer N5 4 turns of wire and the layer N6 3 turns of wire.

The wire used is a steel wire of diameter 2.00 mm, completely coated in a substantially uniform layer of elastomer composition measuring approximately 0.14 mm.

Figure 3:
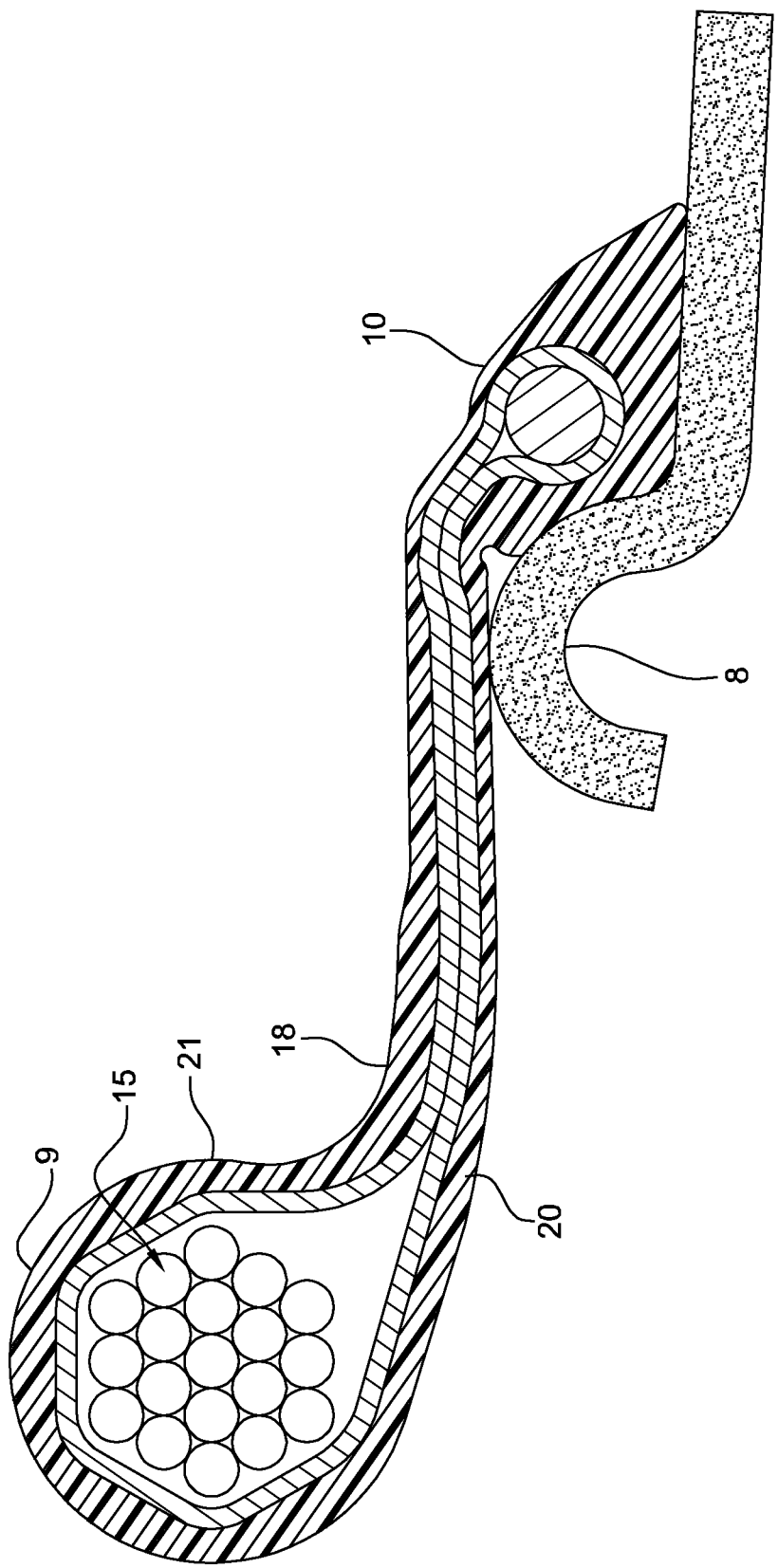
FIG. 3: a radial section of a non-mounted adapter, according to a third alternative form of the invention.

FIG. 3 differs from FIGS. 1 and 2 in that the axially inner end 10 is held against the rim bead seat 8 by a simple catching of known type when the tyre is placed under pressure.

Figure 4:
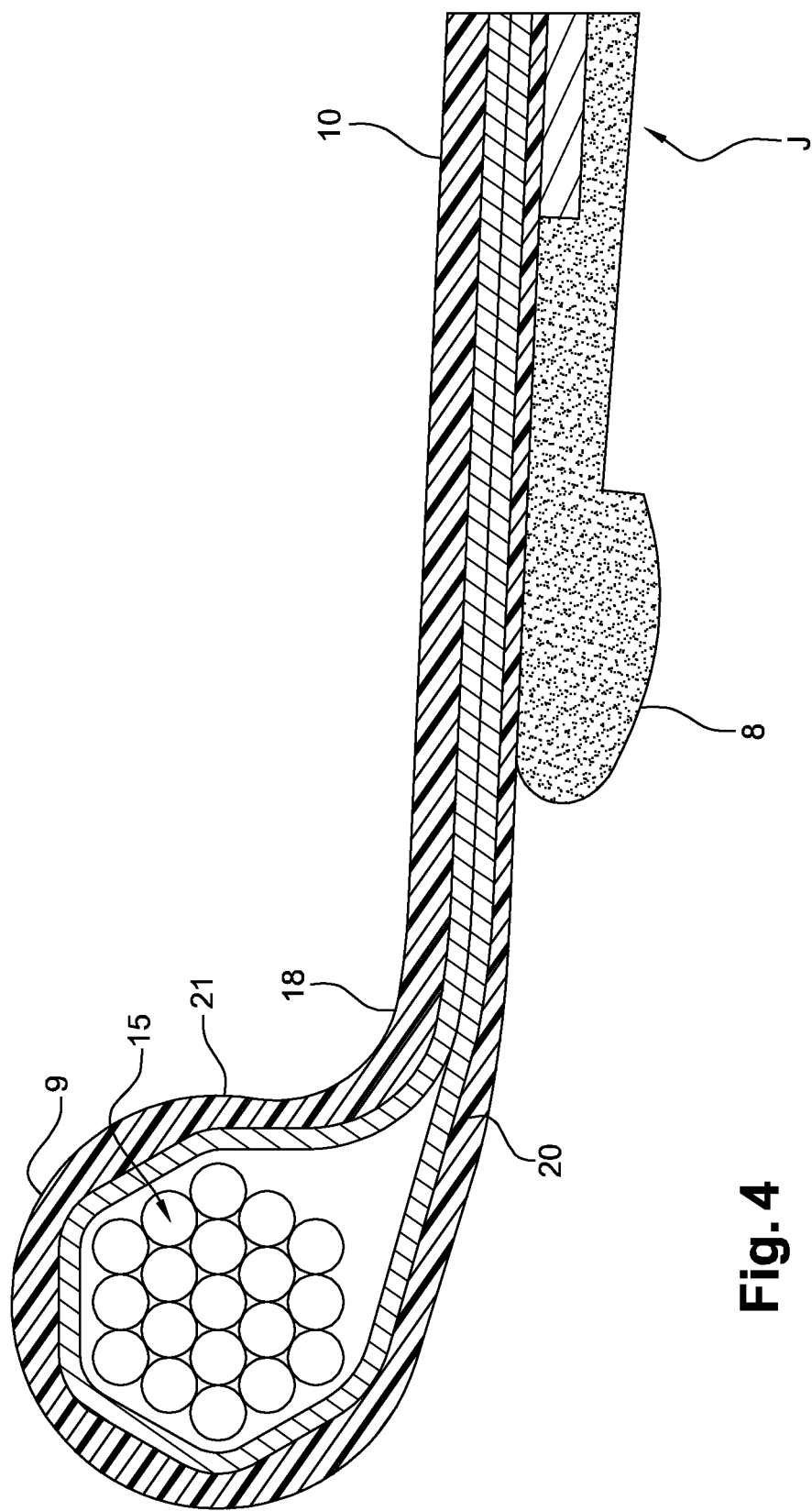
FIG. 4: a radial section of a non-mounted adapter, according to a fourth alternative form of the invention.

FIG. 4 depicts an attachment of the adapter by bonding the axially inner end 10 to the rim bead seat 8.

Figure 5:
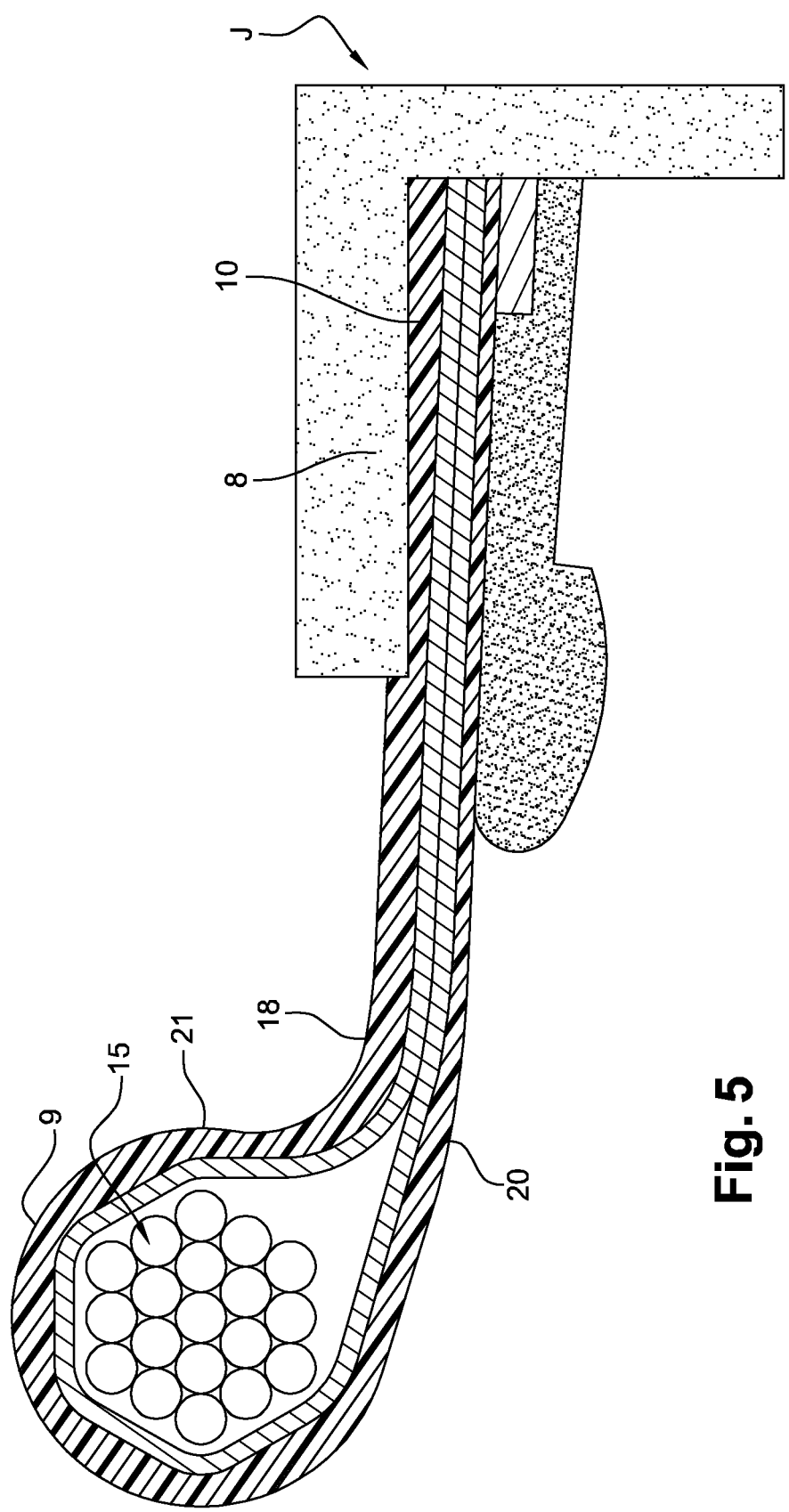
FIG. 5: a radial section of a non-mounted adapter, according to a fifth alternative form of the invention.

FIG. 5 depicts an attachment of the adapter by crimping the inner end 10 into the rim bead seat 8.

Figure 6:
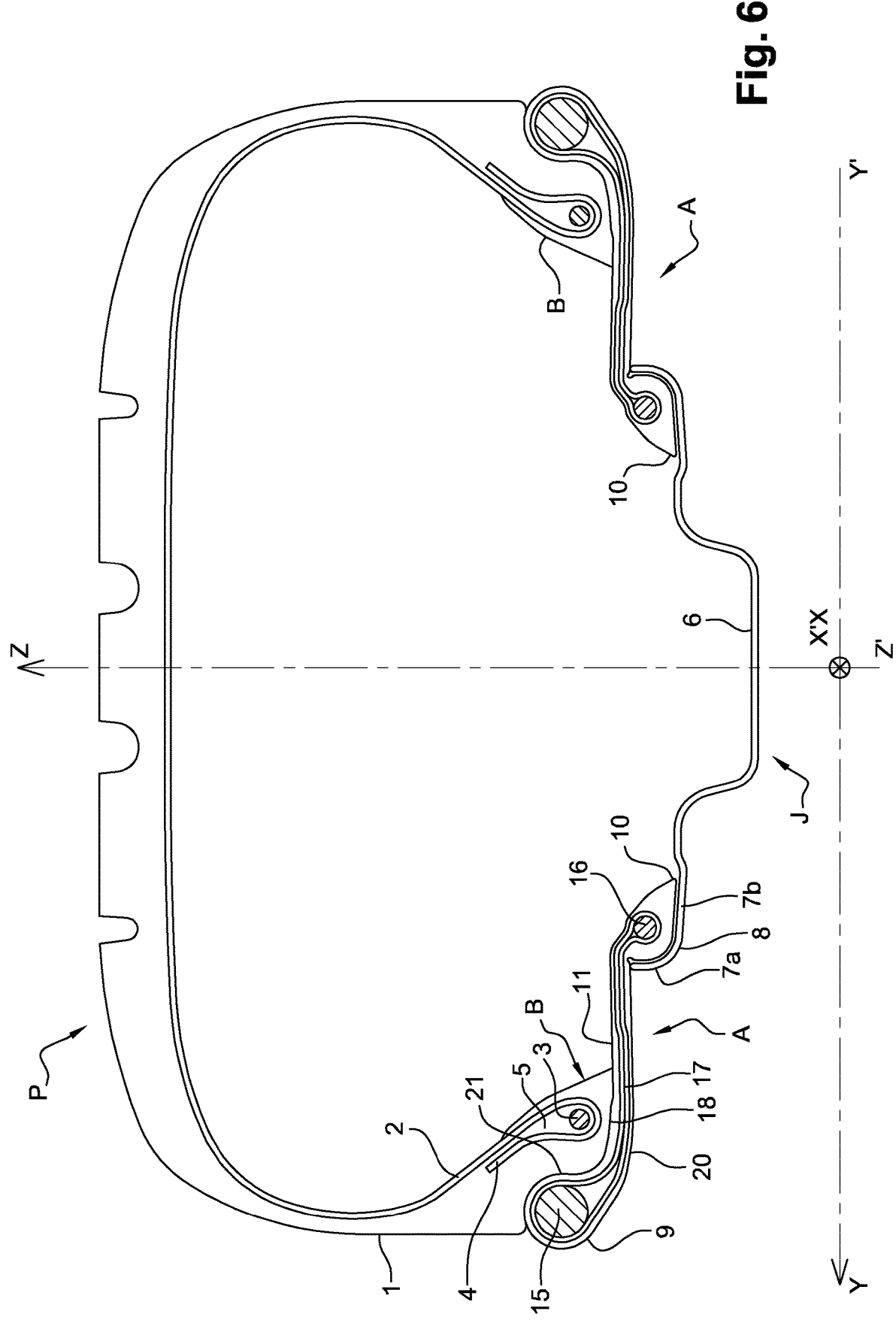
FIG. 6: a radial section of a rolling assembly comprising two adapters.

FIG. 6 shows a radial section, in a plane YZ, of a rolling assembly comprising a tyre P, a rim J, and, for each bead B, an adapter A providing the connection between the bead B and the rim J. The tyre P comprises a tread (unreferenced) extended radially towards the inside by two sidewalls 1, themselves extended radially towards the inside by two beads B. Within each bead B, the carcass reinforcement 2 is turned up around a circumferential reinforcing element or bead wire 3 to form a turnup 4 separated from the carcass reinforcement 2 by a filling element 5. The rim J comprises, in a middle portion, a mounting well 6, intended to make it easier to mount the beads B of the tyre P and, at its axial ends, two rim bead seats 8, each one comprising a substantially radial portion or rim flange 7a and a substantially axial portion or rim seat 7b. The adapter A comprises an axially inner end 10 comprising an inner reinforcing element 16 and intended to be mounted on a rim bead seat 8, an axially outer end 9 comprising an outer reinforcing element 15 and intended to come into contact via a substantially radial axially inner face, or bearing face 21, with a bead B, and finally a body 11, connecting the axially outer end 9 to the axially inner end 10 so as to form a single piece, comprising at least one main reinforcement 17 providing the connection between the outer reinforcing element 15 and the inner reinforcing element 16, and comprising a substantially axial adapter seat 18 intended to come into contact with a bead B.

EXAMPLE 1: COMPRESSION TEST

In this example, the adapter is mounted between a tyre of size 245/40 R 18 and a rim of size 6B17. The inner end of the adapter has a dimension of 17″ and the outer end of 18″.

Table I below collates results of proof pressure measurements for the one same size of tyre mounted on adapters that differ in terms of the number and diameter of wire(s) making up the outer reinforcer.

Experience shows that the tyre inflation pressure places the outer reinforcer under compression hoop stress with reference to the deformation experienced by the reinforcers tested.

TABLE I

| Adapter | Proof pressure (bar) |
| --- | --- |
| Adapter 1 - 19 turns of wire 1.7 mm in diameter coated in a 0.14 mm elastomer sheath | Higher than 12 |
| Adapter 2 - 19 turns of wire 2 mm in diameter coated in a 0.14 mm elastomer sheath | Higher than 17 |
| Adapter 3 - 19 turns of wire 2.15 mm in diameter coated in a 0.14 mm elastomer sheath | Higher than 22 |
| Adapter 4 - 25 turns of wire 2 mm in diameter coated in a 0.14 mm elastomer sheath | Higher than 23 |

From this table, it may be seen that increasing the diameter of the wire, and, therefore, its individual cross section, makes it possible effectively to increase the proof pressure (adapters 2 and 4—increase of 15%) by comparison with increasing the number of wires (adapters 2 and 4—increase of 32%) by comparison with increases in the bulk or mass of the outer reinforcer which correspond respectively to 15% (adapter 3) and 32% (adapter 4).

The invention claimed is:

1. An adapter for a rolling assembly having an axis of rotation and comprising a tire having two beads and a rim having two rim bead seats, the adapter providing, for each bead, the connection between a bead and a rim, and the adapter having:
    an axially inner end comprising an inner reinforcing element connected to the rim;
    an axially outer end comprising an outer reinforcing element and intended to come into contact, via a substantially radially extending axially inner face with the bead, the substantially radially extending axially inner face being a bearing face; and
    a body connecting the axially outer end to the axially inner end, comprising at least one main reinforcement providing the connection between the outer reinforcing element and the inner reinforcing element, and comprising a substantially axial adapter seat intended to come into contact with the bead,
    wherein the outer reinforcing element is completely axially on the outside of the bearing face and completely axially on the outside of a rim flange, and
    wherein the outer reinforcing element is a substantially annular structure of substantially polygonal section, comprising an individual metal wire of diameter D1, the individual metal wire being coated in an elastomer composition and wound contiguously at least three times in an axial direction and at least twice in a radial direction.

2. The adapter according to claim 1, wherein the axially inner end comprising the inner reinforcing element is intended to be mounted on a rim bead seat.

3. The adapter according to claim 1, wherein the elastomer composition coating the individual metal wire has a mean thickness between 0.05 mm and 0.3 mm.

4. The adapter according to claim 1, wherein the diameter D1 of the individual metal wire is between 0.5 mm and 5 mm.

5. The adapter according to claim 1, wherein the individual metal wire is wound between 3 and 10 times in the axial direction.

6. The adapter according to claim 1, wherein the individual metal wire is wound between 2 and 9 times in the radial direction.

7. A rolling assembly comprising the adapter according to claim 1.

* * * * *